US010528954B2

(12) United States Patent
Shintani

(10) Patent No.: US 10,528,954 B2
(45) Date of Patent: Jan. 7, 2020

(54) TRACKING ACTIVATION OF LICENSABLE COMPONENT IN AUDIO VIDEO DEVICE BY UNIQUE PRODUCT IDENTIFICATION

(71) Applicant: Sony Corporation, Tokyo (JP)

(72) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 14/015,409

(22) Filed: Aug. 30, 2013

(65) Prior Publication Data

US 2014/0013348 A1 Jan. 9, 2014

Related U.S. Application Data

(60) Division of application No. 13/048,981, filed on Mar. 16, 2011, now Pat. No. 8,589,305, which is a
(Continued)

(51) Int. Cl.
*G06Q 30/00* (2012.01)
*H04N 5/44* (2011.01)
(Continued)

(52) U.S. Cl.
CPC ........... *G06Q 30/018* (2013.01); *G06F 21/10* (2013.01); *G06F 21/125* (2013.01); *G06Q 20/20* (2013.01); *G06Q 30/0251* (2013.01); *G06Q 30/0283* (2013.01); *G06Q 40/10* (2013.01); *G06Q 40/12* (2013.12); *H04N 5/44* (2013.01); *H04N 5/4401* (2013.01); *H04N 9/641* (2013.01); *H04N 9/642* (2013.01); *H04N 21/2541* (2013.01); *H04N 21/2543* (2013.01); *H04N 21/25816* (2013.01); *H04N 21/4263* (2013.01);
(Continued)

(58) Field of Classification Search
CPC .................................................... G06Q 30/018
USPC ............................................. 705/50; 725/25
See application file for complete search history.

(56) References Cited

U.S. PATENT DOCUMENTS 3,827,260 A    8/1974   Kato
5,737,035 A    4/1998   Rotzoll
(Continued)

FOREIGN PATENT DOCUMENTS

CN    1744099 A    3/2006
CN    1823345 A    8/2006
(Continued)

OTHER PUBLICATIONS

Peter Shintani, Aran Sadja, Theodore R. Booth, Ludovic Douillet, "Reducing TV Licensing Costs" File History of related pending U.S. Appl. No. 12/970,215, filed Dec. 16, 2010.
(Continued)

*Primary Examiner* — Mamon Obeid
*Assistant Examiner* — John Winter
(74) *Attorney, Agent, or Firm* — John L. Rogitz

(57) ABSTRACT

An audio-video display device (AVDD) includes a licensable component providing a licensable function. The licensable function is available to present data on the AVDD without paying a license fee to exploit the licensable function when the AVDD is in a retail demonstration mode, whereas post-vending of the AVDD the licensable function is available to present data on the AVDD only pursuant to a license fee therefor being arranged.

11 Claims, 8 Drawing Sheets

Related U.S. Application Data continuation-in-part of application No. 12/970,215, filed on Dec. 16, 2010, now Pat. No. 9,449,324.

(60) Provisional application No. 61/412,552, filed on Nov. 11, 2010.

(51) Int. Cl.

| | |
|---|---|
| *H04N 9/64* | (2006.01) |
| *H04N 21/434* | (2011.01) |
| *G06Q 30/02* | (2012.01) |
| *H04N 21/258* | (2011.01) |
| *H04N 21/426* | (2011.01) |
| *H04N 21/438* | (2011.01) |
| *H04N 21/6547* | (2011.01) |
| *H04N 21/658* | (2011.01) |
| *G06F 21/12* | (2013.01) |
| *G06Q 40/00* | (2012.01) |
| *H04N 21/2543* | (2011.01) |
| *G06F 21/10* | (2013.01) |
| *H04N 21/254* | (2011.01) |
| *H04N 21/4627* | (2011.01) |
| *G06Q 20/20* | (2012.01) |

(52) U.S. Cl.
CPC ..... *H04N 21/4347* (2013.01); *H04N 21/4382* (2013.01); *H04N 21/4627* (2013.01); *H04N 21/6547* (2013.01); *H04N 21/6581* (2013.01)

(56) References Cited

U.S. PATENT DOCUMENTS

| | | |
|---|---|---|
| 5,794,052 A | 8/1998 | Harding |
| 5,894,516 A | 4/1999 | Brandenburg |
| 6,047,128 A | 4/2000 | Zander |
| 6,199,044 B1 | 3/2001 | Ackley et al. |
| 6,658,663 B1 | 12/2003 | Bruynsteen |
| 6,959,436 B2 | 10/2005 | Peng |
| 7,222,206 B2 | 5/2007 | Kee et al. |
| 7,292,692 B2 | 11/2007 | Bonan et al. |
| 6,827,260 B2 | 12/2007 | Stoutenburg et al. |
| 7,350,707 B2 | 4/2008 | Barkan et al. |
| 7,487,129 B2 | 2/2009 | Doll-Steinberg |
| 7,508,459 B2 | 3/2009 | Mayer et al. |
| 7,671,758 B1 | 3/2010 | Seidel et al. |
| 7,678,984 B1 | 3/2010 | Lamere |
| 7,747,533 B2 | 6/2010 | Zhang et al. |
| 7,809,583 B2 | 10/2010 | Rusman et al. |
| 7,831,539 B2 | 11/2010 | Folting et al. |
| 7,890,430 B2 | 2/2011 | Lopatic |
| 7,896,043 B2 | 3/2011 | Kashiwai |
| 8,217,753 B2 | 7/2012 | Harris |
| 8,239,274 B2 | 8/2012 | Karki et al. |
| 8,266,710 B2 | 9/2012 | Al-Azzawi |
| 8,401,935 B2 | 3/2013 | Shintani et al. |
| 8,417,641 B1 | 4/2013 | Wiltgen et al. |
| 8,543,513 B2 | 9/2013 | Shintani et al. |
| 8,544,111 B2 | 9/2013 | Shintani et al. |
| 8,589,305 B2 | 11/2013 | Shintani |
| 2001/0034846 A1 | 10/2001 | Beery |
| 2001/0039514 A1 | 11/2001 | Barenbaum et al. |
| 2002/0002706 A1 | 1/2002 | Spunk |
| 2002/0049717 A1 | 4/2002 | Routtenberg et al. |
| 2003/0046566 A1 | 3/2003 | Holopainen |
| 2003/0066080 A1 | 4/2003 | Kamienieki |
| 2003/0097571 A1 | 5/2003 | Hamilton et al. |
| 2003/0105704 A1 | 6/2003 | Sundel |
| 2003/0158807 A1 | 8/2003 | Takeshi |
| 2003/0191650 A1 | 10/2003 | Turner et al. |
| 2004/0024666 A1 | 2/2004 | Walker et al. |
| 2004/0068740 A1 | 4/2004 | Fukuda et al. |
| 2004/0098752 A1 | 5/2004 | Bruynsteen |
| 2004/0153379 A1 | 8/2004 | Joyce et al. |
| 2004/0181310 A1 | 9/2004 | Stashluk et al. |
| 2004/0249815 A1 | 12/2004 | Lee |
| 2005/0039025 A1 | 2/2005 | Main et al. |
| 2005/0076334 A1 | 4/2005 | Demeyer |
| 2005/0138387 A1 | 6/2005 | Lam et al. |
| 2005/0154795 A1 | 7/2005 | Kuz et al. |
| 2006/0022034 A1 | 2/2006 | Barkar et al. |
| 2006/0059571 A1 | 3/2006 | Chen et al. |
| 2006/0064756 A1 | 3/2006 | Ebert |
| 2006/0088010 A1 | 4/2006 | Buchwald et al. |
| 2006/0106726 A1 | 5/2006 | Raley et al. |
| 2006/0111920 A1 | 5/2006 | Jacobs et al. |
| 2006/0131397 A1 | 6/2006 | Reddy et al. |
| 2006/0146200 A1 | 7/2006 | Edde et al. |
| 2006/0156392 A1 | 7/2006 | Baugher |
| 2006/0179058 A1 | 8/2006 | Bram et al. |
| 2006/0190052 A1 | 8/2006 | Yun et al. |
| 2006/0200420 A1 | 9/2006 | Osada |
| 2006/0287998 A1 | 12/2006 | Folting et al. |
| 2007/0016532 A1 | 1/2007 | Zhang et al. |
| 2007/0027815 A1 | 2/2007 | Sobel et al. |
| 2007/0107067 A1 | 5/2007 | Fountian |
| 2007/0150294 A1 | 6/2007 | Rusman et al. |
| 2007/0174919 A1 | 7/2007 | Raines et al. |
| 2008/0005608 A1 | 1/2008 | Greenlee |
| 2008/0083040 A1 | 4/2008 | Dani et al. |
| 2008/0134237 A1 | 6/2008 | Tu et al. |
| 2008/0178298 A1 | 7/2008 | Arai et al. |
| 2008/0216177 A1 | 9/2008 | Yokosato et al. |
| 2008/0243683 A1 | 10/2008 | Patel et al. |
| 2008/0250443 A1 | 10/2008 | Fan et al. |
| 2008/0313086 A1 | 12/2008 | Milgramm |
| 2009/0006225 A1 | 1/2009 | Multerer et al. |
| 2009/0019501 A1 | 1/2009 | Saxena et al. |
| 2009/0055320 A1* | 2/2009 | Goertler ............ G06F 19/328 705/59 |
| 2009/0106038 A1 | 4/2009 | Sawaki et al. |
| 2009/0171747 A1 | 7/2009 | Lanning et al. |
| 2009/0183000 A1 | 7/2009 | Krig |
| 2009/0187965 A1 | 7/2009 | Nakamura et al. |
| 2009/0198618 A1 | 8/2009 | Chan et al. |
| 2009/0205040 A1 | 8/2009 | Zunke |
| 2009/0212909 A1 | 8/2009 | Burger et al. |
| 2009/0254482 A1* | 10/2009 | Vadlamani ............ G06F 21/10 705/59 |
| 2009/0264104 A1 | 10/2009 | Lee et al. |
| 2009/0293560 A1 | 12/2009 | Ikeguchi |
| 2009/0303075 A1* | 12/2009 | Spit .................. G08C 17/00 340/4.3 |
| 2009/0307757 A1 | 12/2009 | Groten |
| 2009/0319410 A1 | 12/2009 | Knight et al. |
| 2009/0320062 A1* | 12/2009 | Hofrichter ......... H04N 5/44513 725/34 |
| 2009/0320073 A1 | 12/2009 | Reisman |
| 2010/0013841 A1* | 1/2010 | Iwata .................. H04N 5/57 345/520 |
| 2010/0026912 A1 | 2/2010 | Ho |
| 2010/0144336 A1 | 6/2010 | Kuk et al. |
| 2010/0156592 A1 | 6/2010 | Lewis |
| 2010/0161383 A1 | 6/2010 | Bulter |
| 2010/0164681 A1 | 7/2010 | Harris |
| 2010/0185868 A1 | 7/2010 | Grecia |
| 2010/0192180 A1 | 7/2010 | Olague et al. |
| 2010/0218181 A1 | 8/2010 | Seiden |
| 2010/0235249 A1 | 9/2010 | Smith et al. |
| 2010/0250400 A1 | 9/2010 | Fernandez Gutierrez |
| 2010/0302380 A1 | 12/2010 | Law et al. |
| 2011/0047540 A1 | 2/2011 | Williams et al. |
| 2011/0054923 A1 | 3/2011 | Miloslavsky et al. |
| 2011/0166968 A1* | 7/2011 | Houng .................. H04N 5/44 705/30 |
| 2011/0295843 A1 | 12/2011 | Ingrassia, Jr. et al. |
| 2011/0302623 A1 | 12/2011 | Ricci |
| 2012/0120250 A1 | 5/2012 | Shintani et al. |
| 2012/0263297 A1 | 10/2012 | Bennett et al. |

(56) References Cited

U.S. PATENT DOCUMENTS

| | | | |
|---|---|---|---|
| 2013/0125240 | A1 | 5/2013 | Xu et al. |
| 2014/0229583 | A1 | 8/2014 | Engstrom et al. |

FOREIGN PATENT DOCUMENTS

| | | | |
|---|---|---|---|
| CN | 1870793 | A | 11/2006 |
| CN | 1894995 | A | 1/2007 |
| CN | 101291477 | A | 10/2008 |
| CN | 101507276 | A | 8/2009 |
| EP | 0715243 | | 6/1996 |
| EP | 0795809 | | 9/1997 |
| EP | 1530339 | A | 5/2005 |
| JP | H09319571 | | 12/1997 |
| JP | 2001331228 | | 11/2001 |
| JP | 2003304458 | | 10/2003 |
| JP | 2004062561 | | 2/2004 |
| JP | 2004248052 | | 9/2004 |
| JP | 2004252931 | | 9/2004 |
| JP | 2006215890 | | 8/2006 |
| JP | 2007516627 | | 6/2007 |
| JP | 2007295255 | | 11/2007 |
| JP | 2010200163 | | 9/2010 |
| JP | 2010238248 | | 10/2010 |
| KR | 1020050115299 | | 7/2005 |
| TW | 08103694 | | 3/2000 |
| TW | 093125155 | | 8/2004 |
| TW | 094132192 | | 9/2005 |
| TW | 095103170 | | 1/2006 |
| TW | 097103652 | | 1/2008 |
| WO | 0008909 | | 2/2000 |
| WO | 02/27528 | | 9/2001 |
| WO | 2003096136 | A2 | 11/2003 |
| WO | 2006081577 | | 8/2006 |
| WO | 2006092840 | | 9/2006 |
| WO | 2008030688 | A1 | 3/2008 |

OTHER PUBLICATIONS

Peter Shintani, Ludovic Etienne Douillet, "Activating Licensable Component Provided by Third Party to Audio Video Device" File History of related pending U.S. Appl. No. 13/927,337, filed Jun. 26, 2013.
Peter Shintani, Ludovic Etienne Douillet, "Activating Licensable Component Using Aggregating Device in Home Network" File History of related pending U.S. Appl. No. 13/034,093, filed Feb. 24, 2011.
Peter Shintani, Aran London Sadja, Ludovic Etienne Douillet, "Activating Licensable Component of Consumer Electronic Device Post-Sale Using Unified Software Package" File History of related pending U.S. Appl. No. 13/072,941, filed Mar. 28, 2011.
Peter Shintani, Aran London Sadja, Ludovic Etienne Douillet, "Tracking Details of Activation of Licensable Component of Consumer Electronic Device" File History of related U.S. Appl. No. 13/654,657, filed Oct. 18, 2012.
Peter Shintani, Stephane Lejeune, Robert Blanchard, Graham Clift, "Audio Video Device with Externally Bundled TV Tuner", File History of related pending U.S. Appl. No. 13/073,222, filed Mar. 28, 2011.
Peter Shintani, "Supplying Omitted Critical Code Portion to Activate Licensable Component in Audio Video Device" File History of related pending U.S. Appl. No. 13/045,835, filed Mar. 11, 2011.
"NCR Executive Gain Critical Insights with Dashboard Solution Built in Four Months", Microsoft Case Studies, http://www.microsoft.com/casestudies/Case_Study_Detail.aspx?casestudyid=4000008281. Sep. 23, 2010 (3 pages).
Ashenas, "Simplicity-Minded Management a Practical Guide to Stripping Complexity Out of your Organization", Harvard Business Review, Dec. 2007, pp. 101-110 (10 pages).
Amazon Web Service, "STR3EM-Digital Distribution System (Ultraviolet Keychest)", http:///str3em.com, created on Jun. 22, 2009.
CNET, "Search results for str3em", http://download.cnet.com/1770-20_4-0.html?query=str3em&tag=404&searrchtype=download, printed from internet May 22, 2012.
Peter Shintani, Stehane Lejeune, Robert Blanchard, Graham Clift, "Audio Video Device Externally Bundled TV Tuner" related pending U.S. Appl. No. 13/073,222, applicants Reply Brief filed Apr. 13, 2014 in response to the Examiner's Answer dated Apr. 13, 2015.
Peter Shintani, Aran London Sadja, Ludovic Etienne Douillet, "Tracking Details of Activation of Licensable Component of Consumer Electronic Device", related U.S. Appl. No. 13/654,657, Applicant's response to Final Office Action filed May 13, 2015.
Peter Shintani, Aran London Sadja, Ludovic Etienne Douillet, "Tracking Details of Activation of Licensable Component Electronic Device" related pending application non-final office action dated Sep. 17, 2014.
Peter Shintani, Aran London Sadja, Ludovic Etienne Douillet, "Tracking Details of Activation of Licensable Component of Consumer Electronic Device" applicants response to non-final office action in related pending application filed Oct. 31, 2014.
Peter Shintani, Ludovic Etienne Douillet, "Activating Licensable Component Using Aggregating Device in Home Network" related U.S Appl. No. 13/034,093 Examiner's Answer dated Nov. 12, 2014.
Peter Shintani, Ludovic Etienne Douillet, "Activating Licensable Component Using Aggregating Device in Home Network" related U.S. Appl. No. 13/034,093 Applicant Reply Brief file Nov. 13, 2014 in response to the Examiner's Answer.
Peter Shintani, Aran London Sadja, Ludovic Etienne Douillet, "Activating Licensable Component of Consumer Electronic Device Post-Sale Using Unified Software Package", related U.S. Appl. No. 13/072,941, Non-Final Office Action dated Jun. 17, 2015.
Peter Shintani, Aran London Sadja, Ludovic Etienne Douillet, "Activating Licensable Component of Consumer Electronic Device Post-Sale Using Unified Software Package", related U.S. Appl. No. 13/072,941, Applicant's response to Non-Final Office Action filed Jun. 18, 2015.
Peter Shintani, Aran London Sadja, "Activating Licensable Component of Consumer Electronic Device Post-Sale Using Unified Software Package", related U.S. Appl. No. 13/072,941, Final Office Action dated Jul. 8, 2015.
Peter Shintani, Aran London Sadja, Ludovic Douillet, "Activating Licensable Component of Consumer Electronic Device at Point of Sale", related U.S. Appl. No. 13/711,028, Non-Final Office Action dated Sep. 11, 2015.
Peter Shintani, Aran London Sadja, Ludovic Douillet, "Activating Licensable Component of Consumer Electronic Device at Point of Sale", related U.S. Appl. No. 13/711,028, Applicant's response to Non-Final Office Action filed Sep. 20, 2015.
Peter Shintani, Stephane Lejeune, Robert Blanchard, Graham Clift, "Audio Video Device with Externally Bundled TV Tuner", Examiner's Answer dated Apr. 13, 2015 of related pending U.S. Appl. No. 13/073,222.
Peter Shintani, Aran London Sadja, Ludovic Etienne Douillet, "Tracking Details of Activation of Licensable Component of Consumer Electronic Device", related U.S. Appl. No. 13/654,657, Non-Final Office Action dated Feb. 26, 2015.
Peter Shintani, Aran London Sadja, Ludovic Etienne Douillet, "Tracking Details of Activation of Licensable Component of Consumer Electronic Device", related U.S. Appl. No. 13/654,657, Applicant's response to Non-Final Office Action filed Feb. 26, 2015.
Peter Shintani, Aran London Sadja, Ludovic Etienne Douillet, "Tracking Details of Activation of Licensable Component of Consumer Electronic Device", related U.S. Appl. No. 13/654,657, Final Office Action dated May 4, 2015.
Peter Shintani, Aran London Sadja, "Activating Licensable Component of Consumer Electronic Device Post-Sale Using Unified Software Package", related U.S. Appl. No. 13/072,941, Applicant's Appeal Brief filed Jul. 24, 2015 in response to the Final Office Action dated Jul. 8, 2015.
Peter Shintani, Aran London Sadja, Ludovic Etienne Douillet, "Tracking Details of Activation of Licensable Component of Consumer Electronic Device", related U.S. Appl. No. 13/654,657, Final Office Action dated Feb. 8, 2016.

(56) References Cited

OTHER PUBLICATIONS

Peter Shintani, Aran London Sadja, Ludovic Etienne Douillet, "Tracking Details of Activation of Licensable Component of Consumer Electronic Device", related U.S. Appl. No. 13/654,657, Applicant's Appeal Brief in response to Final Office Action filed Feb. 9, 2016.

Peter Shintani, Aran London Sadja, Ludovic Etienne Douillet, "Activating Licensable Component of Consumer Electronic Device at Point of Sale", related U.S. Appl. No. 13/711,028, Final Office Action dated Jan. 21, 2016.

Peter Shintani, Aran London Sadja, Ludovic Etienne Douillet, "Activating Licensable Component of Consumer Electronic Device at Point of Sale", related U.S. Appl. No. 13/711,028, Applicant's response to Final Office Action dated Feb. 9, 2016.

Peter Shintani, Aran London Sadja, Ludovic Etienne Douillet, "Tracking Details of Activation of Licensable Component of Consumer Electronic Device" related U.S. Appl. No. 13/645,657, non-final office action dated Nov. 18, 2015.

Peter Shintani, Aran London Sadja, Ludovic Etienne Douillet, "Tracking Details of Activation of Licensable Component of Consumer Electronic Device" related U.S. Appl. No. 13/645,657, applicants response to non-final office action filed Dec. 8, 2015.

Peter Shintani, Aran London Sadja, Ludovic Douillet, "Activating Licensable Component of Consumer Electronic Device at Point of Sale", related U.S. Appl. No. 13/711,028, Non-Final Office Action dated Jul. 13, 2016.

Peter Shintani, Aran London Sadja, Ludovic Douillet, "Activating Licensable Component of Consumer Electronic Device at Point of Sale", related U.S. Appl. No. 13/711,028, Applicant's response to Non-Final Office Action filed Jul. 22, 2016.

Peter Shintani, Aran London Sadja, Ludovic Douillet, "Activating Licensable Component of Consumer Electronic Device at Point of Sale", related pending U.S. Appl. No. 13/711,028, final office action dated Nov. 16, 2016.

Peter Shintani, Aran London Sadja, Ludovic Douillet, "Activating Licensable Component of Consumer Electronic Device at Point of Sale", related pending U.S. Appl. No. 13/711,028, applicant's response to final office action filed Dec. 14, 2016.

* cited by examiner

System

TV

Setup Logic

Auto License Logic

Licensing Logic

TRACKING ACTIVATION OF LICENSABLE COMPONENT IN AUDIO VIDEO DEVICE BY UNIQUE PRODUCT IDENTIFICATION

This application claims priority to U.S. patent application Ser. No. 12/970,215, filed Dec. 16, 2010 and to U.S. provisional patent application Ser. No. 61/412,552, filed Nov. 11, 2010.

FIELD OF THE INVENTION

The present application relates generally to tracking activation of licensable components in audio video devices such as TVs using unique product identifications.

BACKGROUND OF THE INVENTION

Televisions incorporate a host of technologies to enable a viewer to watch programming from a variety of sources. These sources include terrestrial broadcast sources of analog (using National Television System Committee, or NTSC, format) and digital (using Advanced Television System Committee, or ATSC, format) TV signals. ATSC signals typically use video compression known as Motion Picture Experts Group (MPEG-2) and TVs must consequently support MPEG-2 decompression if they support ATSC programming.

Cable-provided "basic" television programming can also be provided in NTSC or quadrature amplitude modulation (QAM) format. Cable-provided "enhanced" programming may also be provided using high definition multimedia interface (HDMI) principles. Likewise, satellite-provided TV signals may be received in HDMI. As well, video from the Internet can be displayed on many modern TVs in a variety of formats, including data over cable service Internet specification (DOCSIS) format. Furthermore, TVs are often configured to support multiple audio formats, including advanced audio coding (AAC), Audio code 3 (AC3), digital theater system (DTS), and so on. And as contemporary viewers know, TVs are expected to support the presentation of electronic program guides (EPGs).

SUMMARY OF THE INVENTION

As understood herein, various TV technologies require license fees to be paid. As further understood herein, many technologies that must be built in to modern TVs to support various program sources may not be used. Nonetheless, license fees for the unused technologies are still paid, unnecessarily cascading cost.

Accordingly, a method includes determining whether an audio video device is in a retail demonstration mode. Responsive to a determination that the device is not in the retail demonstration mode, the method includes enabling licensing fee triggering of a licensable component such that activation of the licensable component triggers a license fee associated with the licensable component. In contrast, responsive to a determination that the device is in the retail demonstration mode, the method includes enabling activation of the licensable component for demonstration purposes without enabling licensing fee triggering of the licensable component such that activation of the licensable component does not trigger the license fee associated with the licensable component.

A processor can be associated with the audio video device to activate the licensable component without contacting an activation server. In this embodiment, the processor may present an encryption element to unlock a license code stored in a protected region of a local storage of the audio video device and that is inaccessible without the encryption element, the license code being used to activate the licensable component. Alternatively, the processor can request a server to provide the license code needed to activate the licensable component in the retail demonstration mode at least in part by sending to the server a unique product ID along with the identity of the licensable component sought to be activated. The unique product ID may be a combination of a serial number of the audio video device and a model number of the audio video device. Additionally or in lieu thereof the unique product ID can be a unique encryption key in the audio video device.

If desired, the processor can present on the display a user interface (UI) configured for enabling a viewer to establish whether the audio video device is in the retail demonstration mode. The UI can present an option to select the retail demonstration mode. In some implementations a retail key must be entered by a viewer into a UI presented on the display to enter the retail demonstration mode. The retail key is provided only to retail outlets such that only by entering the retail key is the audio video device placed in the retail demonstration mode. Failure to enter the retail key prevents the audio video device from being placed in the retail demonstration mode such that if the audio video device is never placed on display in a retail outlet but instead is vended directly out of the box, an end user cannot enter the retail demonstration mode and thereby avoid license fee triggering.

In another aspect, a TV includes a licensable component for which a license has not been obtained prior to vending the TV. The licensable component provides a licensable feature. A TV display and a processor in the TV controlling the display are also provided. The processor executes software code associated with the TV to actuate the licensable component to provide a presentation on the display in accordance with the licensable feature without implementing a license fee payment therefor at least in part responsive to the TV being in a retail demonstration mode. On the other hand, the processor executes software code associated with the TV to actuate the licensable component to provide a presentation on the display in accordance with the licensable feature and implementing a license fee payment therefor at least in part responsive to the TV being in a post-vending mode.

In another aspect, an audio video display device (AVDD) includes a licensable component providing a licensable function. The licensable function is available to present data on the AVDD without paying a license fee to exploit the licensable function when the AVDD is in a retail demonstration mode, whereas post-vending of the AVDD, the licensable function is available to present data on the AVDD only pursuant to a license fee transaction therefor being arranged.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
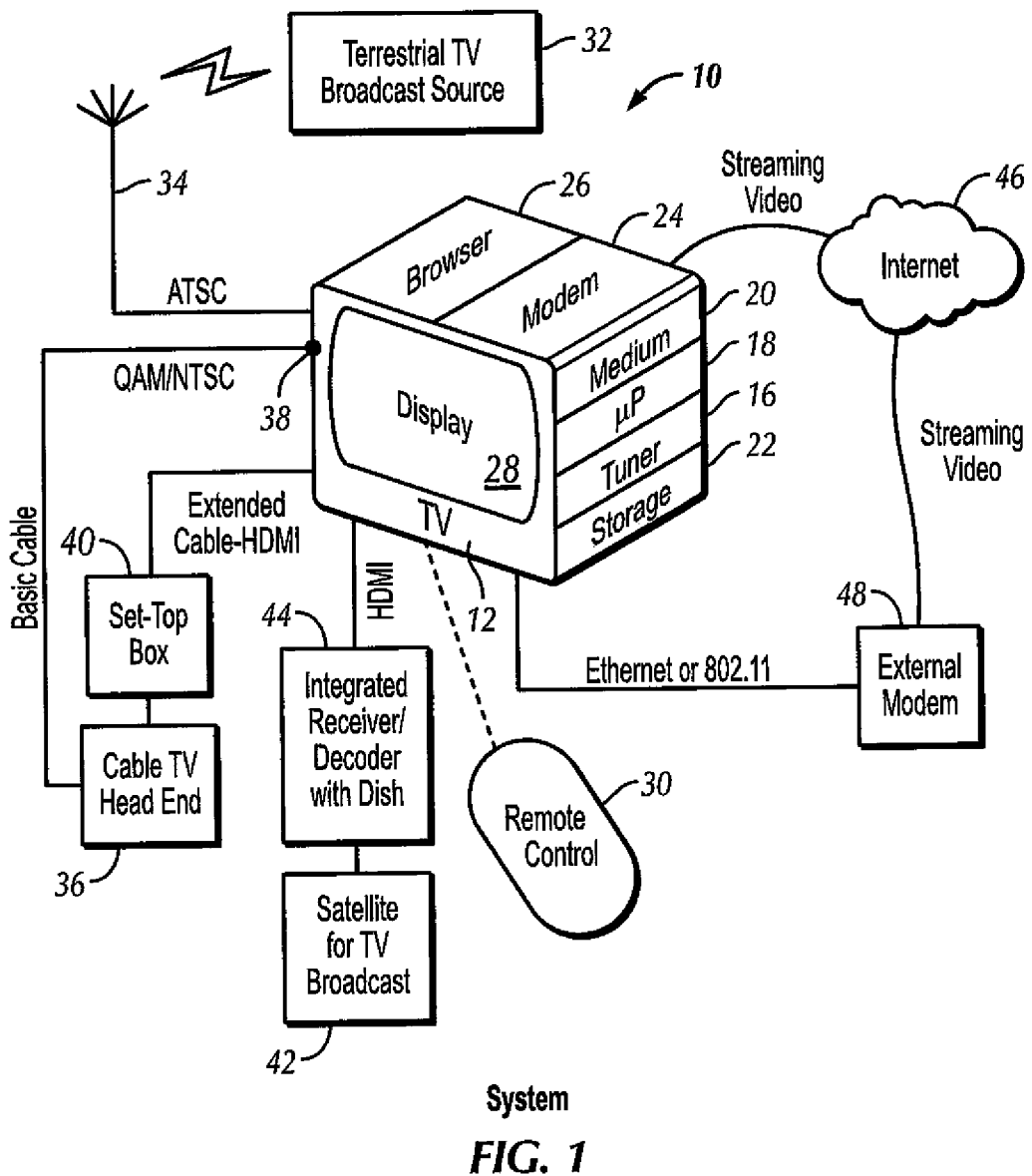
FIG. 1 is a block diagram of a non-limiting example system in accordance with present principles.

Referring initially to the non-limiting example embodiment show in FIG. 1, a system 10 includes an audio video device such as a TV 12 including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display. User commands to the processor 18 may be wirelessly received from a remote control (RC) 30 using, e.g., rf or infrared. Audio-video display devices other than a TV may be used, e.g., smart phones, game consoles, personal digital organisers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

Figure 2:
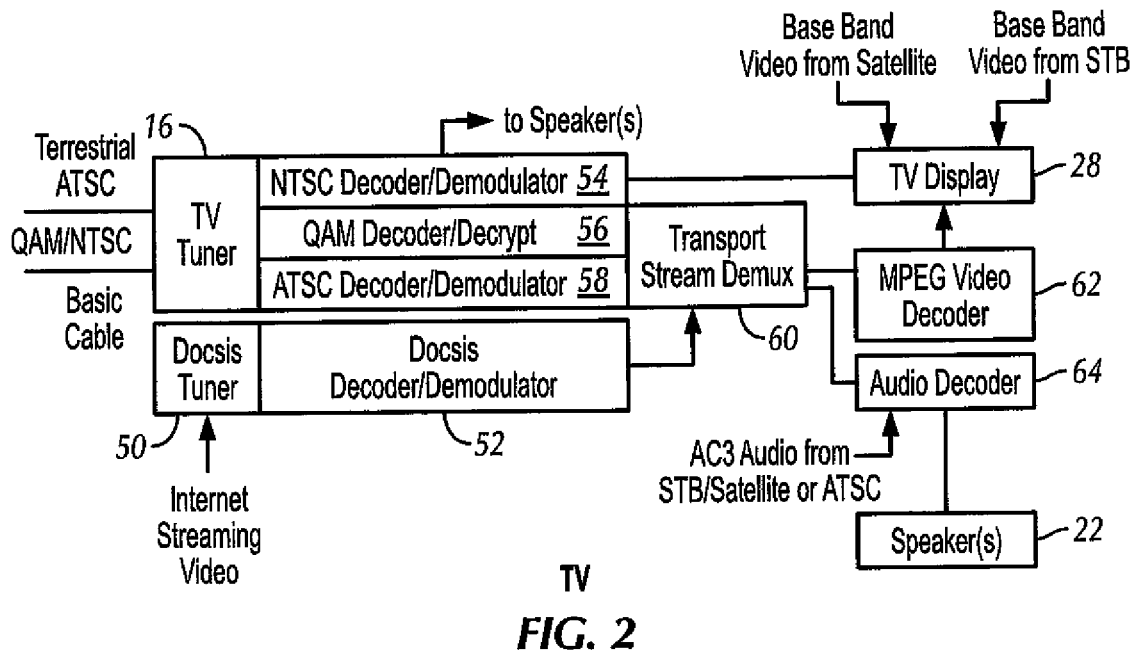
FIG. 2 is a block diagram of an example TV.

FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an NTSC decoder/demodulator 54, or a QAM decoder/demodulator 56, or an ATSC decoder/demodulator 58. The output from the NTSC decoder/demodulator 54 can be sent directly to the display 28 and speakers 22 for presentation. On the other hand, the output from the digital decoder/demodulators 56, 58 typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Figure 3:
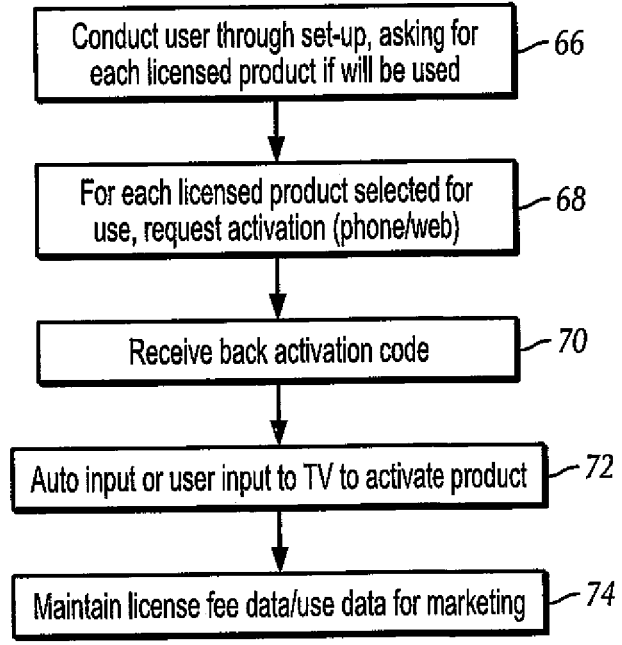
FIG. 3 is a flow chart of non-limiting TV set up logic in accordance with present principles.

Now referring to FIG. 3, at block 66 a user of the TV 12 can be conducted, using onscreen user interfaces (UI), through a set-up routine upon first power on or thereafter from a menu to set up various features of the TV. As an example, the user may be asked, for one or more licensable components within the TV, if the user desires to use that component. This may be done implicitly, e.g., by asking the user if the user wishes to automatically scan the broadcast spectrum to detect channels, in which case it may be inferred that the ATSC decoder/demodulator 58 and MPEG decoder 62 will be required and, hence, that licenses to use those components will be needed. Also, in this latter case it may be inferred that a license to the terrestrial broadcast EPG may be required, whereas such a license would not be required if terrestrial broadcast were not being used as an input source.

Or again, the user may be given the choice to receive Internet video through the built-in modem 24 or from an external modem 48 and if the latter is chosen, no license need be obtained for the internal browser 26; otherwise, a license may be required to use the internal browser 26.

Proceeding to block 68, for each license that is inferred to be required based on the user set-up selections at block 66, the TV 12 uploads a request for the license over the Internet, for example, or back through a two-way cable system, etc. Or, as explained further below the request may be made by telephone. Regardless of how made, the request typically identifies the component for which a license is required based on user input at block 66 along with a unique identification of the TV, e.g., a hash of the TV model number and serial number, in some embodiments encrypted if desired. The request may be made at set-up time. Alternatively, the request may be cached for later upload when, e.g., an appropriate broadband connection is sensed. In any case, the request may be sent to an Internet server at a prestored Internet address or to a cable head end or to another appropriate licensing entity or agent.

Block 70 indicates that assuming it passes authentication the TV 12 receives back the license in the form of licensing information, typically a code that must be input to the TV processor 18 to enable or unlock the associated component. The code may be automatically input to the appropriate internal components of the TV at block 72 or the code may be displayed on the TV and the user prompted by means of an onscreen UI to enter the code using, e.g., the RC 30. Proper input of the code activates the related component within the TV. Block 74 simply indicates that license fee data is maintained and used to generate billing information from the licensing agency to the manufacturer of the TV, and may also be used to generate marketing data as discussed further below. The data may be kept in the TV until uploaded to a licensing entity/agent by means noted above.

Figure 4:
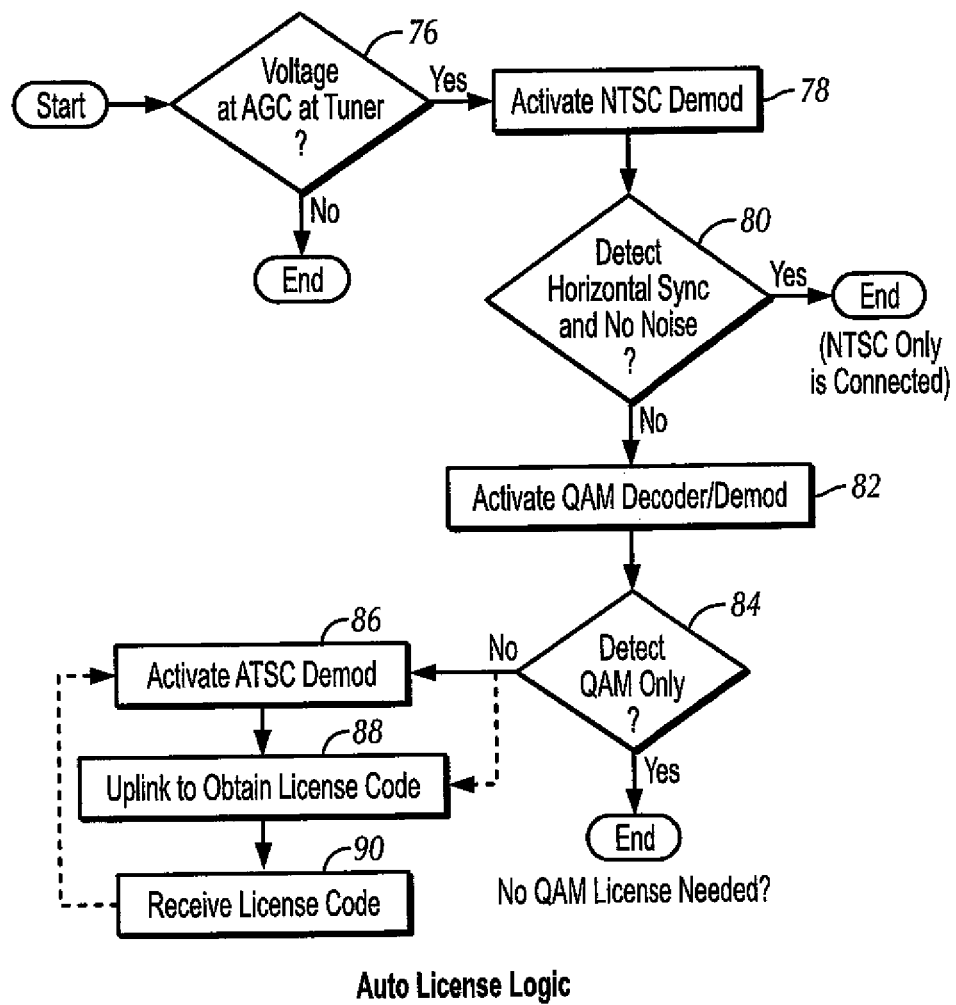
FIG. 4 is a flow chart of non-limiting logic for automatically detecting whether an ATSC demodulator is required to be activated.

FIG. 4 shows that automatic license determinations may be made outside of a user set-up routine if desired. In the example shown in FIG. 4, commencing at decision diamond 76 it is determined whether a predetermined physical condition exists in the TV, e.g., a particular kind of connection, from which it may be inferred what licensable components will be required. In the example of FIG. 4, the physical condition is the presence of a voltage in the automatic gain control (AGC) circuitry of the tuner 16, which would occur when, for instance, a connection is made at the TV chassis to the terrestrial antenna 34 or when a cable from the wall is connected to the F-type connector 38.

When the tested-for physical condition exists, the logic flows to block 78, in this example to activate the NTSC demodulator 54. This is done recognizing that NTSC demodulators typically require no licenses, so to avoid unnecessarily requesting licenses, the signal at the tuner 16 is first tested to determine if it is an NTSC signal. Decision diamond 80 indicates that the test may be whether "noise", is present in the signal.

If the test indicates that NTSC signals only are present the logic ends, but otherwise the logic flows to block 82 to activate the QAM decoder/demodulator 56. If QAM only is detected (by the QAM decoder/demodulator 56 recognizing QAM signals and/or no noise) the logic ends, but if the QAM decoder/demodulator 56 does not recognize the signal, this indicates that the signal is neither QAM nor (from decision diamond 80) NTSC, with the inference thus being that the signal is ATSC requiring use of the ATSC decoder/demodulator 58, which is activated at block 86 to process the signal. At block 88 an uplink is obtained by the TV processor 18 to the above-described licensing entity/agent to obtain the license code discussed above using the unique ID of the TV, and at block 90 the code is received and used as necessary to permit use of the ATSC decoder/demodulator 58.

Or, the step at block 90 can be omitted and the ATSC decoder/demodulator 58 immediately activated on the assumption that the processor 18 is programmed to send a message to the licensing entity/agent that licensing accounting is to be generated after activation of the ATSC decoder/demodulator 58.

Yet again, as shown in dashed lines in FIG. 4 the logic may flow first from decision diamond 84 to blocks 88 and 90 to obtain the licensing "unlock" code and then back to block 86 to activate the ATSC decoder/demodulator 58 using the code, to ensure that no use may be made of the ATSC decoder/demodulator 58 until such time as the licensing entity/agent has been informed of its use, has authenticated the TV for the necessary ATSC license, and has determined that under business rules the license code should be downloaded to fulfill the request.

Additional example inference rules that may be employed pursuant to automatically obtaining needed component licenses after vending the TV to avoid paying for unnecessary licenses prior to sale of the TV include, if there is ATSC present, it is less likely that QAM will be found; if ATSC is present, the total number of ATSC channels will be much smaller than the number for QAM channels. Also, when signals are received from an external modem 48, audio video programming does not require use of the built-in browser 26 and so receipt of video over an Ethernet link without receipt of signals at the internal modem 24 may be inferred to mean that the browser 26 is not in use.

Figure 5:
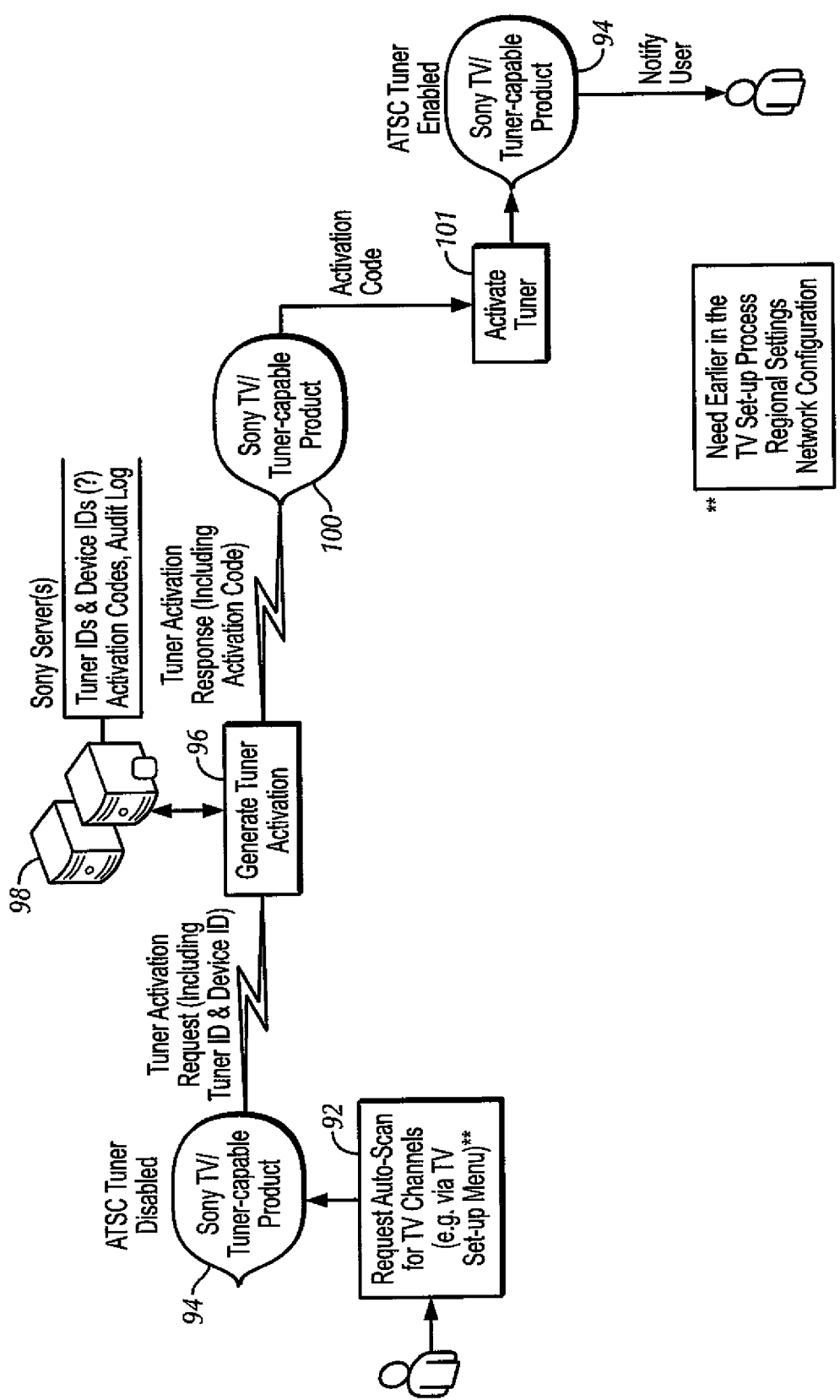
FIGS. 5-7 are schematic diagrams illustrating alternate methods for activating an ATSC demodulator.
Figure 6:
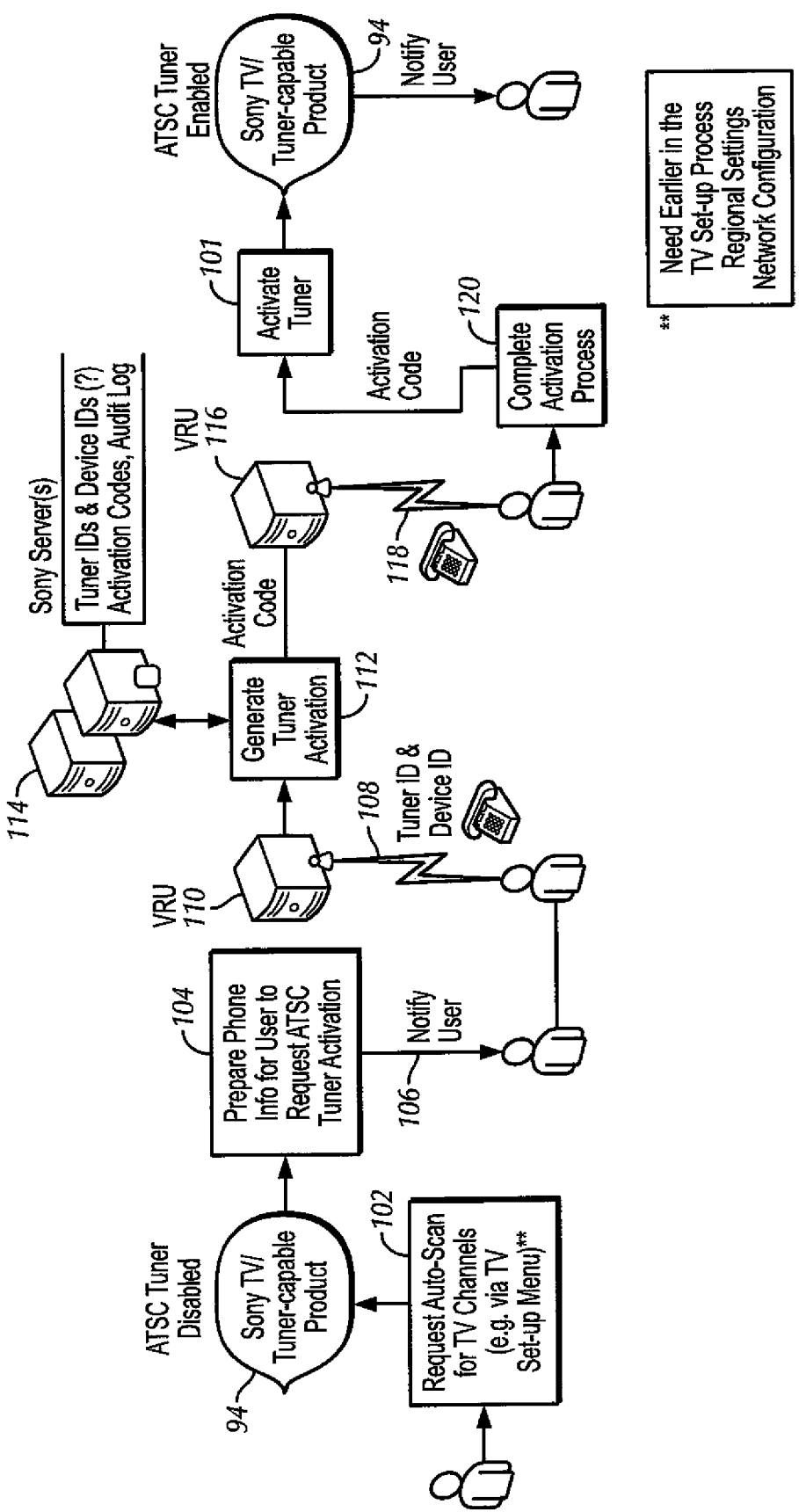
Figure 7:
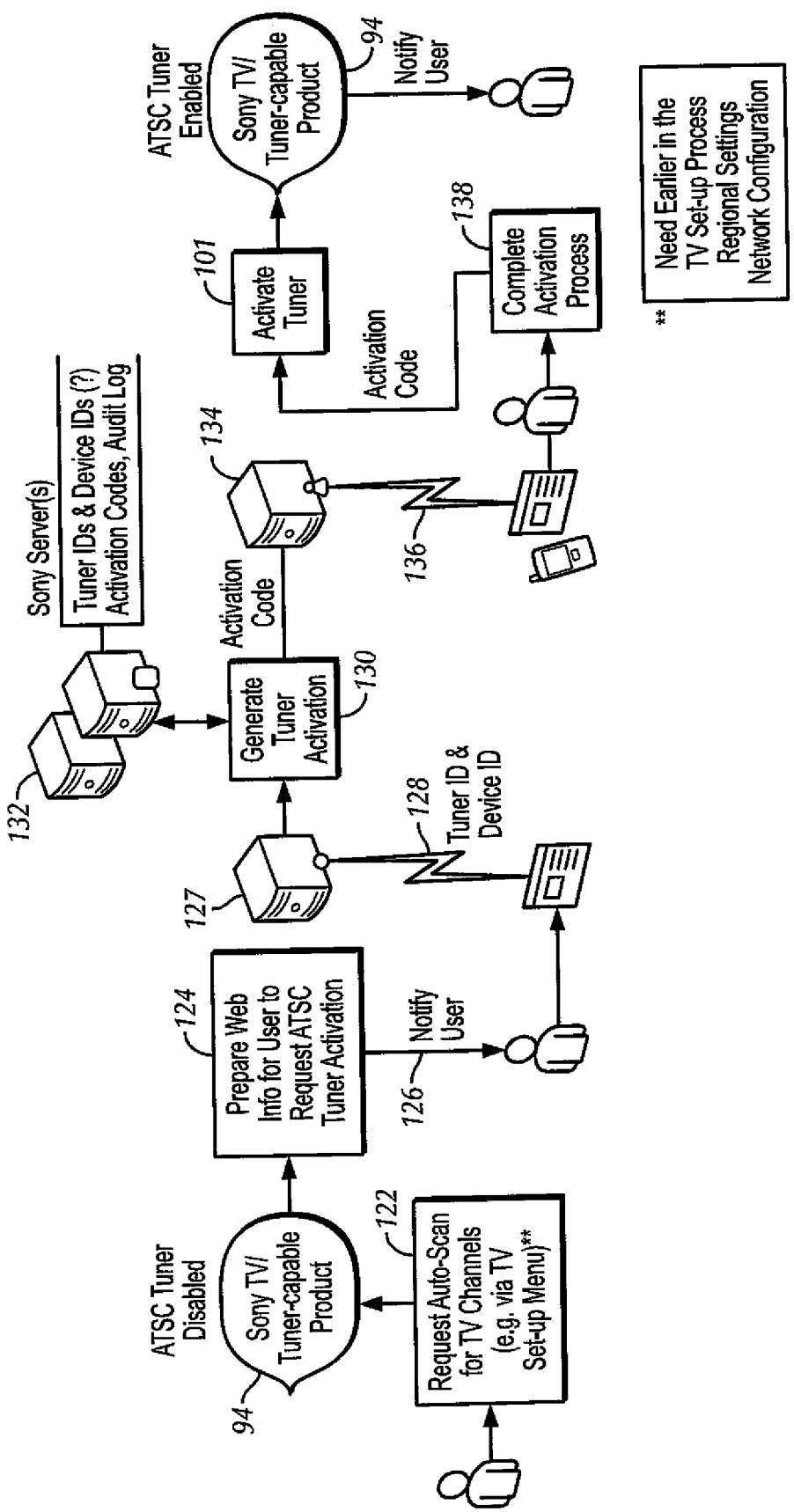

FIGS. 5-7 illustrate logic that may be used during setup to obtain licenses. Using, e.g., the RC 30, a person may input 92 a request to conduct auto-scan of available terrestrial or cable or satellite channels from, e.g., an onscreen setup menu presented on an audio video display product 94 (which may be implemented by the TV 12). In response, the AV display product sends an activation request for, e.g., the ATSC decoder/demodulator 58 which may include the tuner ID and product 94 ID and/or the decoder/demodulator 58 ID/product 94 ID. Activation of the ATSC decoder/demodulator 58 is executed at 96 using activation codes from one or more licensing entities/agents such as server 98, provided the licensing entities/agents determine, based on the information received from the product 94, that the product is entitled to a license for the requested component.

A log may be kept by the licensing entities/agents indicating what products and what components in those products have been activated and based on that log, licensing accounting data may be generated for purposes of presenting licensing invoices for activated components to the manufacturer of the product 94. In any case, 100 indicates that the product 94 receives the activation response, e.g., activation codes, to activate the demodulator/decoder 58 at 101, which converts the product 94 to an ATSC-capable device. The user may be notified using onscreen notification that ATSC programming may now be viewed using the product 94.

FIG. 6 shows an alternative embodiment. Using, e.g., the RC 30, a person may input 102 a request to conduct auto-scan of available terrestrial or cable or satellite channels from, e.g., an onscreen setup menu presented on an audio video display product 94 (which may be implemented by the TV 12). In response, at 104 telephone information including a phone number to a licensing entity/agent is prepared and the user notified 106 of the information by means of, e.g., a user interface or prompt presented on the product 94. The user enters 108 the information into a telephone, either by speaking the number or by holding the telephone adjacent a speaker on the product 94 for receiving dual tone multifrequency (DTMF) tones from the product that are detected by the telephone and used to automatically dial the number using, e.g., a voice response unit (VRU) 110.

Other alternate embodiments involve sending short message service (SMS) messages to a server to send the above information or scanning bar-type codes on the TV or component to send the requisite information to the server to obtain the license. In any case, determining what licenses are needed may be accomplished upon start up and/or periodically during operation.

Tuner activation is generated at 112 by licensing entities/agents 114 such as Internet servers and the activation code discussed above sent 116 to the VRU 110, which presents the code to the user to complete the activation process at 120. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

FIG. 7 shows another alternative embodiment. Using, e.g., the RC 30, a person may input 122 a request to conduct auto-scan of available terrestrial or cable or satellite channels from, e.g., an onscreen setup menu presented on an audio video display product 94 (which may be implemented by the TV 12). In response, at 124 Internet information including an Internet address of a licensing entity/agent is prepared and the user notified 126 of the information by means of, e.g., a user interface or prompt presented on the product 94. The user enters 128 the information into, e.g., a home computer 127. Tuner activation is generated at 130 by licensing entities/agents 132 such as Internet servers and the activation code discussed above sent 134 to the computer, which presents 136 the code to the user by means of, e.g., a web page or telephone to complete the activation process at 138. Activation of the licensable component, e.g., the ATSC decoder/demodulator 58, is executed at 101, which converts the product 94 to an ATSC-capable device. The user may be notified using onscreen notification that ATSC programming may now be viewed using the product 94.

Alternatively, licensing information may be exchanged using short message service (SMS) codes or by using bar codes. To use bar codes the TV can include a camera that images the bar codes on various components, which are interpreted by the processor 18 as identifying information.

In some instances, if only a limited number (e.g., two) NTSC channels are needed, a limited and less expensive license may be requested and granted to permit access to only those two channels through the NTSC demodulator with a license being requested and granted to any component such as a stereo audio decoder should the legacy device (typically, a VCR) use such audio.

Figure 8:
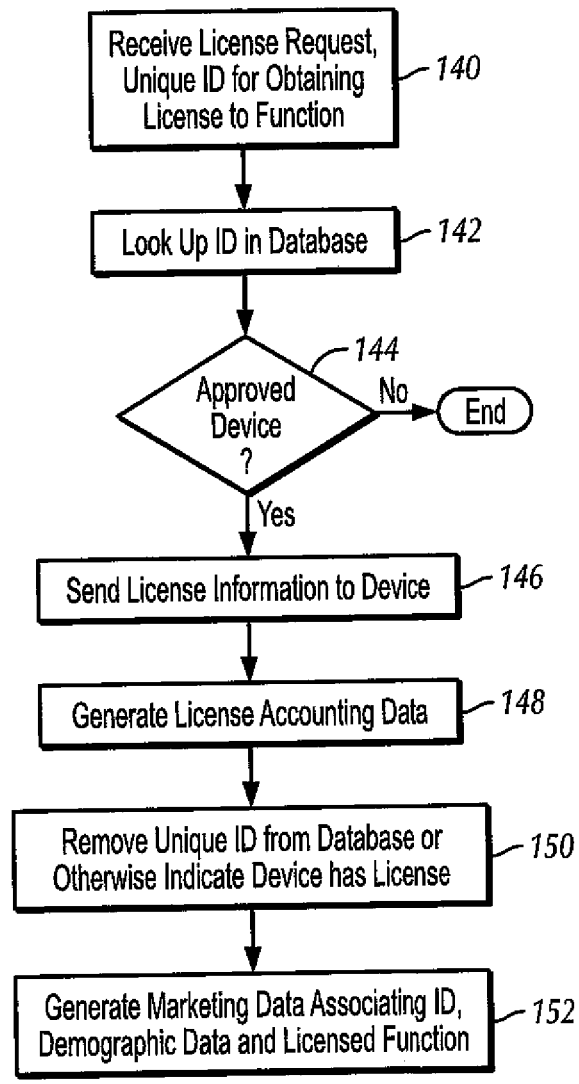
FIG. 8 is a flow chart of non-limiting logic for licensing a component in a TV.

FIG. 8 shows logic that may be executed by a licensing entity/agent computer. Commencing at block 140, a license request from, e.g., the TV 12 is received at, e.g., any of the above-described servers or head ends, which are programmed with software to execute the logic shown in FIG. 8. The unique ID discussed above is looked up at block 142 and the requesting device is authenticated at decision diamond 144 by, e.g., determining if the device is on a list of approved devices. If desired, it may be further determined whether a license for the particular licensable component that is the subject of the request has already been granted and if so, authentication fails. If the requesting device is approved and a license for the licensable component that is the subject of the request has not already been granted, the logic moves to block 146 to send license information, e.g., activation codes, to the requesting device.

Block 148 indicates that license accounting data is generated pursuant to sending the activation code to the requesting device. This accounting data can be used to effect remuneration from the manufacturer of the requesting device to the licensing authority for the component that is the subject of the request. At block 150 the authorized device database is modified to record the grant of the license.

Marketing data may be generated at block 152 based on the license grant. As an example, the total number of devices vended with the licensable component may be compared against the number of licenses granted to requesting devices to ascertain usage of the component compared to other components within the requesting device. For instance, it might be noted that 30% of vended devices of a particular TV model ever request activation of the ATSC tuner. This data can moreover be correlated to demographic data obtained during device registration so that, as an example, of the 30% of devices requesting activation of the TV tuner, it can be known which geographic region was more likely to request such activation, or which demographic age group, etc. It may be further ascertained, using device registration information submitted by purchasers, that of the devices requesting activation of the ATSC tuner, for example, 90% of those devices were second or third home TVs that consequently can be inferred to lack a cable or satellite hookup.

It is preferred that once a licensable component has been activated by obtaining a license for it, it cannot subsequently be deactivated by the user, to avoid multiple license payments for the same component. Accordingly, the TV processor 18 may be programmed to refuse deactivation commands from the user if any are input for any component that has been activated and licensed, at least insofar as deactivation would require another license to reactivate.

Verification of license may also be provided by the TV processor so that, for example, if a component license is requested by the TV but the corresponding feature never used within some period of time, the TV can retract the license request and any license fees refunded as a result.

Without limitation, the need for paying for licenses for the following technologies may be determined during TV set-up or subsequently by automatically detecting whether the technologies are being used:

Video Decoders

MPEG-2 video, MPEG-2 video with optical disk, MPEG4 advanced video coding (AVC), MPEG4 Visual, MPEG video codec (VC) 1

Audio Decoders unified AAC (MPEG 2&4 AAC) 2ch, unified AAC (MPEG 2&4 AAC) 3ch, Dolby Digital AC3 2ch, Dolby Digital AC3 5.1ch, Dolby Digital Plus (DD+) 2ch, ProLogic2 (Surround Sound), MPEG audio 1&2 layer 1, 2, 3) MP3, DTS_Blueray disk (BD) (2CH/2CH+Digital Out), BBE Sound, sound retrieval system (SRS) sound EPGs Gemstar Guide EPG, non-Gemstar EPG (SI-EPG)

Demodulators

Association of Radio Industries and Businesses (ARIB) (D+BS+CS), ATSC, digital video broadcasting (terrestrial) (DVB-T)

Other Components Including Digital Rights Management (DRM)

Joint Photographic Expert Group (JPEG), digital transmission content protection (DTCP)/AACP/Open MG, HDMI, System Synchronized Brightness Control (contrast enhancement), Inverter controller integrated circuit (IC), IEEE 802.11 wireless license, IEEE 802.11(n), BD Pool (player), BD Pool (recorder), digital video disk (DVD) format, IEEE 802.11/16, IEEE 1394

Software

JAVA, MRP/Ginga interactive TV software, JAVA-BD combination, DivX codec software, Windows Media Audio, Windows Media Video, Windows Media Network read, Windows Media digital rights management (DRM), audio watermark, Netfront, web browser software.

Additionally, production encryption keys and test encryption keys may be used to permit testing a licensable component in production, pre-sale, without triggering the above-described license request mechanisms. A TV may be placed in a test activation mode used only in the manufacturing or test phase, and if desired the test mode may have a hardwired time out. A test key or keys can be used to activate licensable components and the license request algorithm recognizes a test key and responsive to the recognition does not request a license. The test activation mode may be hardwired to deactivate after a single power cycle and the TV processor may not permit reactivation of the test mode thereafter. Activation of a licensable component thereafter requires a production key which is associated with a license request.

Figure 9:
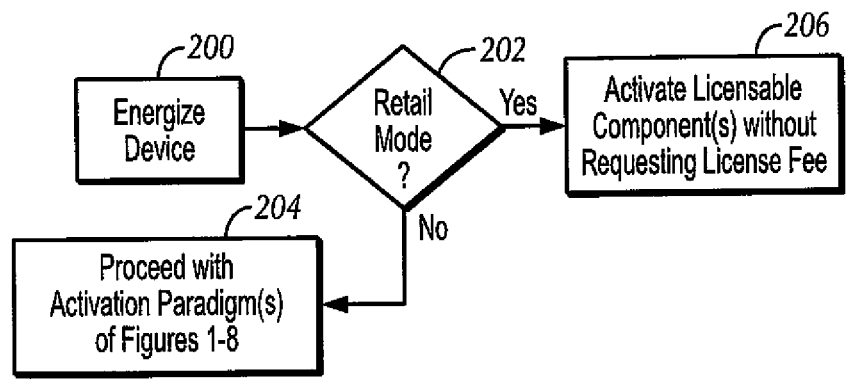
FIG. 9 is a flow chart of example logic for operating the audio video device in the retail mode so as not to trigger payment of a license fee.

FIG. 9 shows logic that may be executed to activate a licensable component of an audio video device in a retail store for demonstration purposes without triggering payment of a license fee. Commencing at block 200, the device 12 is energized and at decision diamond 202 a processor such as the processor 18 determines whether the device 12 is in a retail demonstration mode. If not, the logic flows to block 204 to proceed as described above to implement activation of one or more licensable components, which typically entails licensing fee triggering.

On the other hand, if it is determined at decision diamond 202 that the device 12 is in the retail demonstration mode, the logic flows from decision diamond 202 to block 206 to activate one or more licensable components in the device 12 for demonstration purposes without triggering a license fee. In one embodiment, in the retail mode the processor 18 activates one or more licensable components without contacting an activation server by, e.g., presenting an encryption element to unlock a license code that may be stored in a protected region of the local storage 22 and that is otherwise inaccessible without the encryption element. The license code is then used to activate the licensable component. Security is provided programmatically in such an embodiment, with the processor being programmed to not present the encryption element to unlock the license code unless the processor determines that the device 12 is in the retail demonstration mode.

Or, in another embodiment the license code may be stored at a remote server and not in local storage 22, and in the retail demonstration mode the processor 18 requests the license code as before by, e.g., sending, through the modem 24 or 48 or cable or other communications interface, the unique product ID mentioned above, along with the identity of the licensable component sought to be activated. The unique product ID may be a combination, e.g., a hash, of the device 12 serial number and device 12 model number. Or, the unique product ID may be a unique encryption key in the device 12 such as a high definition content protection (HDCP) key selection vector (KSV) or DTCP certificate. The server compares the unique device 12 ID to a list of authorized device IDs and if a match is found, returns to the processor 18 the license code required to unlock the licensable component. If no match is found, and/or (in some embodiments) if a match is found but the license code has already been requested in the retail mode, the license code is not returned by the server to the device 12. In this way, the server and, hence, the licensor of the licensable component knows how many times the licensable component has been activated for demonstration purposes and can compare this against the actual fee-generating license request that may eventually be made by a purchaser subsequent to demonstration in accordance with principles above.

An alternative determination that the device 12 is in a retail demonstration mode may be made by the device 12 follows. The device 12 can receive audio through a microphone connected to the device 12 processor, and if the audio as determined by audio pattern recognition software indicates that multiple sources of audio are playing the same audio simultaneously (as is often the case with multiple TVs in a store being tuned to the same channel), a determination of "retail demonstration mode" at decision diamond 202 may be returned.

Another alternative determination that the device 12 is in a retail demonstration mode may be made by the device 12 follows. The device 12 can use connectivity, either ad-hoc (e.g., through a local area wireless Ethernet), AP, or mesh technology and discover other similar CE devices in the immediate vicinity and if several are discovered, the device 12 can infer it is in the retail demonstration mode at decision diamond 202. In this case, only a single brand of CE device need be set up and later-energized CE devices in the vicinity can then detect the first authorized retail CE device in making their own determinations at decision diamond 202. Yet a third alternative is to define (using, e.g., frequency, pulse characteristics, etc.) an industry standard short range RF or IR signal to be a "retail beacon" that is transmitted in retail outlets. When the CE device 12 detects the retail beacon, it determines it is in the retail demonstration mode at decision diamond 202.

Figure 10:
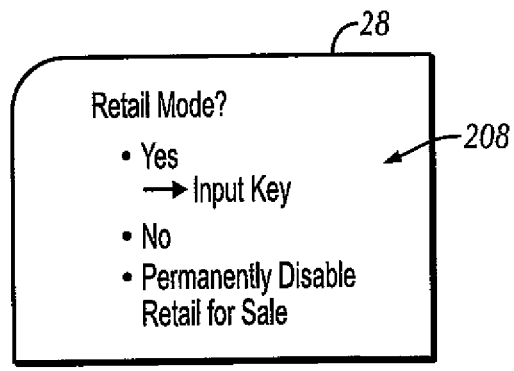
FIG. 10 is a screen shot of an example user interface (UI) to support the retail mode.

FIG. 10 illustrates an example non-limiting mechanism, in this case, a UI 208 that is presented on the display 28, that may be used to establish whether the device is in the retail demonstration mode. The UI 208 may be presented at power on or at some other point of operation, e.g., when a licensable component is invoked by attempting to present data on the display 28 requiring use of the licensable component. In this latter case the UI 208 may not be presented if a license to the licensable component has already been purchased but only if no license to the licensable component has been purchased but use of the component is desired or attempted.

As shown, a viewer is presented with the option of selecting "yes" or "no" with respect to the retail mode, with "yes" meaning that the device 12 is to be determined to be in the retail mode at decision diamond 202 in FIG. 9 and "no" meaning that the device 12 is to be determined not to be in the retail mode at decision diamond 202 in FIG. 9. The viewer may appropriately manipulate the RC 30 to navigate and make selections from the UI 208 in FIG. 10. When "yes" is selected, the viewer may be prompted as shown to enter a retail mode key, which is provided only to retail outlets. Only by entering the retail key can the device 12 be placed in the retail mode at decision diamond 202/block 206. Failure to enter the key causes the device 12 to be placed in the normal mode at block 204 after, e.g., a predetermined timeout period during which no authorized key is received even if "yes" is selected from the UI 208. In this way, in the event that the device 12 is never placed on display in the retail outlet but instead is vended directly out of the box, an end user cannot enter the retail mode and thereby avoid the license activation logic of FIGS. 1-8. Additionally, the example UI 208 in FIG. 10 may further allow a retail store clerk to permanently disable the retail mode upon sale of the device 12, in which case the UI 208 is never presented again on the display 28 and the device 12 remains in the normal mode at block 204. Also, the retail mode may be permanently disabled automatically and the device 12 always thereafter remaining in the normal mode upon occurrence of a predetermined condition, e.g., the device 12 has been powered up and retail mode selected and entered by entering an authorized retail key more than a threshold number of times, e.g., twenty.

While the particular TRACKING ACTIVATION OF LICENSABLE COMPONENT IN AUDIO VIDEO DEVICE BY UNIQUE PRODUCT IDENTIFICATION is herein shown and described in detail, it is to be understood that the subject matter which is encompassed by the present invention is limited only by the claims.

What is claimed is:

1. Audio video device (AVD) comprising:
a licensable component providing a licensable function related to presentation of audio video information on at least one display; and
at least one computer memory that is not a transitory signal and that comprises instructions executable by at least one digital processor to configure the digital processor to:
determine whether the AVD us in a retail demonstration mode;
present data on the AVD according to the licensable component without paying a license fee to exploit the licensable function responsive to a determination that the AVD is in the retail demonstration mode;
present data on the AVD according to the licensable component only pursuant to a license fee transaction for the licensable component post-vending of the AVD;
determine a number of times the retail demonstration mode has been selected; and
permanently disable the retail demonstration mode responsive to a determination that the AVD has been powered up and retail demonstration mode selected more than a threshold number of times.

2. The AVD of claim 1, wherein the instructions are executable to:
activate the licensable component without contacting an activation server.

3. The AVD of claim 1, wherein the instructions are executable to:
request a server to provide a license code needed to activate the licensable component in the retail demonstration mode at least in part by sending to the server a unique product ID along with the identity of the licensable component sought to be activated.

4. The AVD of claim 3, wherein the unique product ID is a combination of a serial number of the AVD and a model number of the AVD and/or a unique encryption key in the AVD.

5. The AVD of claim 1, wherein the instructions are executable to:
present on a display of the audio video device a user interface (UI) configured for enabling a viewer to establish whether the audio video device is in the retail demonstration mode, the UI presenting an option to select the retail demonstration mode.

6. The AVD of claim 1, wherein the instructions are executable for:
actuating the licensable component to provide a presentation on a video display in accordance with the licensable feature without implementing a license fee payment therefor at least in part responsive to an indication that the AVD has not been vended;
subsequently disabling the licensable component at least in part responsive to a determination that the AVD has been vended.

7. The AVD of claim 6, wherein the indication that the AVD has not been vended includes a determination that the AVD is in the retail demonstration mode.

8. A device comprising:
at least one computer memory that is not a transitory signal and that comprises instructions executable by at least one processor to:
actuate licensable component in an audio video device (AVD) to provide a presentation on a video display in accordance with a licensable feature without implementing a license fee payment therefor at least in part responsive to a determination that audio received by the AVD indicates that multiple sources of audio are playing the same audio as each other;
subsequently disable the licensable component at least in part responsive to a determination that the AVD has been vended.

9. A device comprising:
at least one computer memory that is not a transitory signal and that comprises instructions executable by at least one processor to:
actuate licensable component in an audio video device (AVD) to provide a presentation on a video display in accordance with a licensable feature without implementing a license fee payment therefor at least in part responsive to an indication that the AVD has not been vended;
subsequently disable the licensable component at least in part responsive to a determination that the AVD has been vended, wherein determining that the AVD has not been vended comprises determining that other CE devices similar to the AVD are in an immediate network vicinity to the AVD.

10. A device comprising:
at least one computer memory that is not a transitory signal and that comprises instructions executable by at least one processor to:
actuate licensable component in an audio video device (AVD) to provide a presentation on a video display in accordance with a licensable feature without implementing a license fee payment therefor at least in part responsive to an indication that the AVD has not been vended;
subsequently disable the licensable component at least in part responsive to a determination that the AVD has been vended, wherein determining that the AVD has not been vended comprises determining that a wireless signal associated with a retail outlet is detected.

11. A device comprising:
at least one computer memory that is not a transitory signal and that comprises instructions executable by at least one processor to:
actuate licensable component in an audio video device (AVD) to provide a presentation on a video display in accordance with a licensable feature without implementing a license fee payment therefor at least in part responsive to an indication that the AVD has not been vended;
subsequently disable the licensable component at least in part responsive to a determination that the AVD has been vended, wherein determining that the AVD has not been vended comprises determining that a retail mode key has not been received within a timeout period.

* * * * *